US009994221B2

(12) United States Patent
McNew (10) Patent No.: US 9,994,221 B2
(45) Date of Patent: Jun. 12, 2018

(54) PRESENTING TRAVEL SETTINGS FOR SELECTION OF NEARBY VEHICLE TO FOLLOW

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 7 days.

(21) Appl. No.: 15/209,339

(22) Filed: Jul. 13, 2016

(65) Prior Publication Data

US 2018/0015922 A1  Jan. 18, 2018

(51) Int. Cl.
*B60W 30/165* (2012.01)
*B60K 35/00* (2006.01)
(Continued)

(52) U.S. Cl.
CPC ........... *B60W 30/165* (2013.01); *B60K 35/00* (2013.01); *B60W 10/04* (2013.01); *B60W 10/18* (2013.01);
(Continued)

(58) Field of Classification Search
CPC . B60W 30/165; G05D 1/0287; G05D 1/0293; B60K 2031/0025; B60K 35/00;
(Continued)

(56) References Cited

U.S. PATENT DOCUMENTS

| 5,014,200 A * | 5/1991 | Chundrlik | B60K 31/0008 |
| | | | 180/167 |
| 6,497,297 B1 * | 12/2002 | Ebert | B60K 35/00 |
| | | | 180/170 |

(Continued)

FOREIGN PATENT DOCUMENTS

| DE | 102014214514 A1 * | 1/2016 | |
| FR | 2927707 A1 * | 8/2009 | ......... G01C 21/3647 |

(Continued)

OTHER PUBLICATIONS

JPO machine translation of JP 2014-133444 (original JP document published Jul. 24, 2014) (Year: 2014).*

(Continued)

*Primary Examiner* — Behrang Badii
*Assistant Examiner* — David A Testardi
(74) *Attorney, Agent, or Firm* — Christopher G. Darrow; Darrow Mustafa PC (57) ABSTRACT

Arrangements described herein provide adaptive cruise control systems that present travel settings for one or more nearby vehicles. Location information for one or more nearby vehicles can be acquired. Travel settings for the one or more nearby vehicles can be acquired. The travel settings can include a set speed and a set distance for each of the one or more nearby vehicles. Arrangements described herein can present within the vehicle the travel settings for the one or more nearby vehicles. A vehicle to follow from the one or more nearby vehicles can be selected based on the displayed travel settings.

11 Claims, 5 Drawing Sheets

(51) Int. Cl.
*B60W 10/04* (2006.01)
*B60W 10/18* (2012.01)
*B60W 10/20* (2006.01)
*G05D 1/02* (2006.01)
*G08G 1/00* (2006.01)

(52) U.S. Cl.
CPC ........... *B60W 10/20* (2013.01); *G05D 1/0293* (2013.01); *G08G 1/22* (2013.01); *B60K 2310/20* (2013.01); *B60W 2550/302* (2013.01); *B60W 2550/308* (2013.01); *B60W 2710/18* (2013.01); *B60W 2710/20* (2013.01); *B60W 2720/10* (2013.01); *B60W 2750/308* (2013.01)

(58) Field of Classification Search
CPC ... B60K 2310/20; B60K 2310/26; G08G 1/22
See application file for complete search history.

(56) References Cited

U.S. PATENT DOCUMENTS

| | | | | |
|---|---|---|---|---|
| 6,789,637 | B1* | 9/2004 | Winner | B60K 31/0008 180/170 |
| 9,037,389 | B2* | 5/2015 | You | G08G 1/22 701/117 |
| 9,189,961 | B2 | 11/2015 | Mehr et al. | |
| 9,605,971 | B2* | 3/2017 | Niehsen | G01C 21/3658 |
| 2002/0121398 | A1* | 9/2002 | Kikuchi | B60K 31/0008 180/169 |
| 2003/0139871 | A1 | 7/2003 | Miller et al. | |
| 2005/0259033 | A1* | 11/2005 | Levine | B60K 26/00 345/7 |
| 2007/0083318 | A1* | 4/2007 | Parikh | B60W 10/06 701/96 |
| 2008/0021627 | A1* | 1/2008 | Johnsson | B60W 10/06 701/96 |
| 2010/0020169 | A1* | 1/2010 | Jang | G01C 21/36 348/115 |
| 2011/0208399 | A1 | 8/2011 | Fekete et al. | |
| 2011/0251768 | A1* | 10/2011 | Luo | B60W 30/12 701/70 |
| 2013/0066511 | A1 | 3/2013 | Switkes et al. | |
| 2013/0201335 | A1* | 8/2013 | Heinemann | H04N 5/262 348/148 |
| 2013/0231829 | A1* | 9/2013 | Gerdt | G05D 1/0061 701/41 |
| 2014/0180569 | A1* | 6/2014 | Ueda | B60W 30/165 701/400 |
| 2015/0081202 | A1* | 3/2015 | Levin | G01C 21/3697 701/400 |
| 2015/0154872 | A1* | 6/2015 | Schafer | G07C 5/008 701/1 |
| 2015/0160653 | A1* | 6/2015 | Cheatham, III | G05D 1/0088 701/23 |
| 2015/0246672 | A1* | 9/2015 | Pilutti | B60W 30/00 701/2 |
| 2016/0018228 | A1* | 1/2016 | Parker | G01C 21/3623 701/412 |
| 2016/0366598 | A1* | 12/2016 | Gallagher | G08G 1/161 |
| 2016/0370201 | A1* | 12/2016 | Pudiyathanda | G01C 21/3667 |
| 2017/0021765 | A1* | 1/2017 | Mori | B60Q 9/00 |
| 2017/0021833 | A1* | 1/2017 | Abdel-Rahman | B60W 30/165 |
| 2017/0225691 | A1* | 8/2017 | Yamada | B60W 50/10 |

FOREIGN PATENT DOCUMENTS

| | | | | |
|---|---|---|---|---|
| JP | 10086698 | A | * | 4/1998 |
| JP | 11042957 | A | * | 2/1999 |
| JP | 2000285381 | A | * | 10/2000 |
| JP | 2001034897 | A | * | 2/2001 |
| JP | 2002046501 | A | * | 2/2002 |
| JP | 2008098931 | A | * | 4/2008 ............ H04W 48/12 |
| JP | 2014133444 | A | * | 7/2014 |
| JP | 2015170095 | A | * | 9/2015 |

OTHER PUBLICATIONS

EPO machine translation of DE 102014214514 (original DE document published Jan. 28, 2016) (Year: 2016).*

* cited by examiner

PRESENTING TRAVEL SETTINGS FOR SELECTION OF NEARBY VEHICLE TO FOLLOW

FIELD

The subject matter described herein relates in general to vehicles and, more particularly, to the operation of such vehicles relative to other vehicles in the surrounding environment.

BACKGROUND

Some vehicles include an operational mode, such as an adaptive cruise control mode, in which a computing system is used to navigate and/or maneuver the vehicle along a travel route. During adaptive cruise control operation, the speed of the ego-vehicle can be limited by preceding vehicles travelling at slower speeds and the smoothness of the ego-vehicles can be affected by whether the preceding vehicle maintains a near constant speed. For this reason it can be helpful for the driver of the vehicle to know and choose to follow a preceding vehicle whose travel settings are close to their desired settings.

SUMMARY

In one respect, the present disclosure is directed to a method of presenting travel settings of nearby vehicles for the selection of a vehicle to follow. The method can include acquiring location information about one or more nearby vehicles within an external environment of a vehicle. The method can further include acquiring travel settings for the one or more nearby vehicles. The travel settings for the one or more nearby vehicles can be presented using a vehicle output system. A selected vehicle of the one or more nearby vehicles to follow can be received.

In another respect, the present disclosure is directed to an adaptive cruise control system for a vehicle. The system can include a sensor system configured to acquire location information and travel settings for one or more nearby vehicles within an external environment of the vehicle. The system can further include a processor operatively connected to the sensor system, and the processor can be programmed to initiate executable operations. The executable operations can include presenting within the vehicle the acquired travel settings for the one or more nearby vehicles. The executable operations can further include receiving a selected vehicle of the one or more nearby vehicles to follow.

DETAILED DESCRIPTION

Arrangements described herein provide adaptive cruise control systems that present travel settings for one or more nearby vehicles. Location information for one or more nearby vehicles within an external environment of an ego-vehicle can be acquired. Travel settings for the one or more nearby vehicles can be acquired. In some arrangements, the travel settings for each of the one or more nearby vehicles can include a set speed and a set distance for each of the one or more nearby vehicles. Arrangements described herein can present within the ego-vehicle the travel settings for the one or more nearby vehicles. An occupant of the ego-vehicle or components of the ego vehicle can select a nearby vehicle to follow from the one or more nearby vehicles, based on the displayed travel settings. The present detailed description relates to systems and methods that incorporate one or more of such features. In at least some instances, such systems and methods can improve the performance and/or the safe operation of a vehicle, while providing greater intuitiveness for adaptive cruise control systems.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
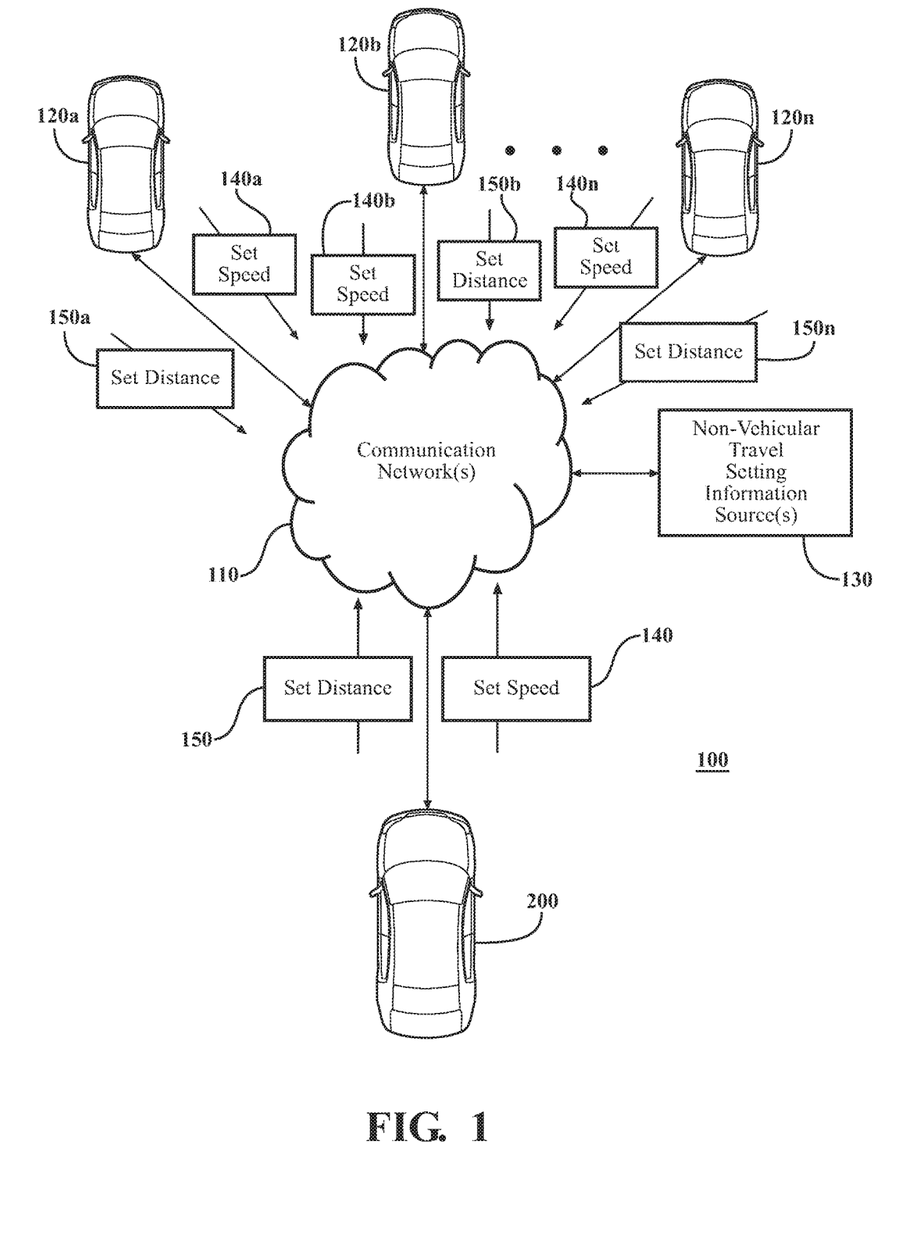
FIG. 1 is an example of a travel settings communication system.

FIG. 1 is an example of a travel settings communication system 100. Some of the possible elements of the system 100 are shown in FIG. 1 and will now be described. It will be understood that it is not necessary for the system 100 to have all of the elements shown in FIG. 1 or described herein. The system 100 can include one or more communication networks 110, one or more nearby vehicles 120, one or more travel setting information sources 130, and/or an ego-vehicle 200.

The various elements of the system 100 can be communicatively linked through one or more communication networks 110. As used herein, the term "communicatively linked" can include direct or indirect connections through a communication channel or pathway or another component or system. A "communication network" means one or more components designed to transmit and/or receive information from one source to another. The communication network(s) 110 can be implemented as, or include, without limitation, a dedicated short-range communication (DSRC) network, a wide area network (WAN), a local area network (LAN), the Public Switched Telephone Network (PSTN), a wireless network, a mobile network, a Virtual Private Network (VPN), the Internet, and/or one or more intranets. The communication network(s) 110 further can be implemented as or include one or more wireless networks, whether short or long range. For example, in terms of short range wireless networks, the communication network(s) 110 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) 110 can include a mobile, cellular, and or satellite-based wireless network and support voice, video, text, and/or any combination thereof. Examples of long range wireless networks can include GSM, TDMA, CDMA, WCDMA networks or the like. The communication network(s) 110 can include wired communication links and/or wireless communication links. The communication network(s) 110 can include any combination of the above networks and/or other types of networks. The communication network(s) 110 can include one or more routers, switches, access points, wireless access points, and/or the like. In one or more arrangements, the communication network(s) 110 can include Vehicle-to-Everything (V2X) technologies (including Vehicle-to-Infrastructure (V2I) and Vehicle-to-Vehicle (V2V) technologies), which can allow for communications between the nearby vehicle(s) 120, the ego-vehicle 200 and any nearby roadside communications nodes and/or infrastructure.

The system 100 can include one or more nearby vehicles 120. A "nearby vehicle" can include any vehicle within the sensor range of the ego-vehicle 200. Alternatively or in addition, the nearby vehicles 120 can include vehicles within a predetermined distance from the ego-vehicle 200. For example, the nearby vehicles 120 can include vehicles within 100 meters. The nearby vehicles 120 can be those vehicles that are located within the sensor range of the ego-vehicle 200 and in which there is no other vehicle located between it and the ego-vehicle 200 and can also include vehicles that are separated from the ego-vehicle 200 by one or more other vehicles. The nearby vehicles 120 can be located in front of the ego-vehicle 200, behind the ego-vehicle 200, and/or nearby the ego-vehicle 200 in a substantially lateral direction.

As mentioned above, the system 100 can include one or more travel setting information sources. The travel setting information source(s) can include any component or group of components capable of providing set speed and/or set distance information for one or more vehicles. In one or more arrangements, the ego-vehicle 200 can be configured to acquire set speed and/or set distance information from the travel setting information source(s). For example, the travel setting information source(s) can be the one or more nearby vehicles 120 (i.e., "vehicular travel setting information source(s)"), or any of a variety of non-vehicular travel setting information source(s) 130, such as a remote server, and/or a remote data store for example.

As used herein, "set speed" can include any target and/or reference speed for a particular vehicle. For example, one or more of the nearby vehicles 120 can each have a set speed as a target speed for that vehicle to achieve. In the example shown in FIG. 1, each of the nearby vehicles 120a, 120b . . . 102n can each include an associated set speed 140a, 140b . . . 140n. In one or more arrangements, the set speed can be determined by a user of the vehicle. Alternatively or in addition, the set speed can be determined by one or more components of an autonomous driving system of the vehicle. For example, one or more of the nearby vehicles 120 can be autonomous vehicles.

"Set distance" can include any target and/or reference distance of travel for a particular vehicle. For example, the set distance can be a desired distance for a vehicle to travel on a particular roadway and/or travel path. One or more of the nearby vehicles 120 can each have a set distance as a target distance for that vehicle to achieve. In the example shown in FIG. 1, each of the nearby vehicles 120a, 120b . . . 102n can each include a set distance 150a, 150b . . . 150n. In one or more arrangements, the set distance can be determined by a user of the vehicle. Alternatively or in addition, the set distance can be determined by one or more components of a navigation and/or autonomous driving system of the vehicle.

Figure 2:
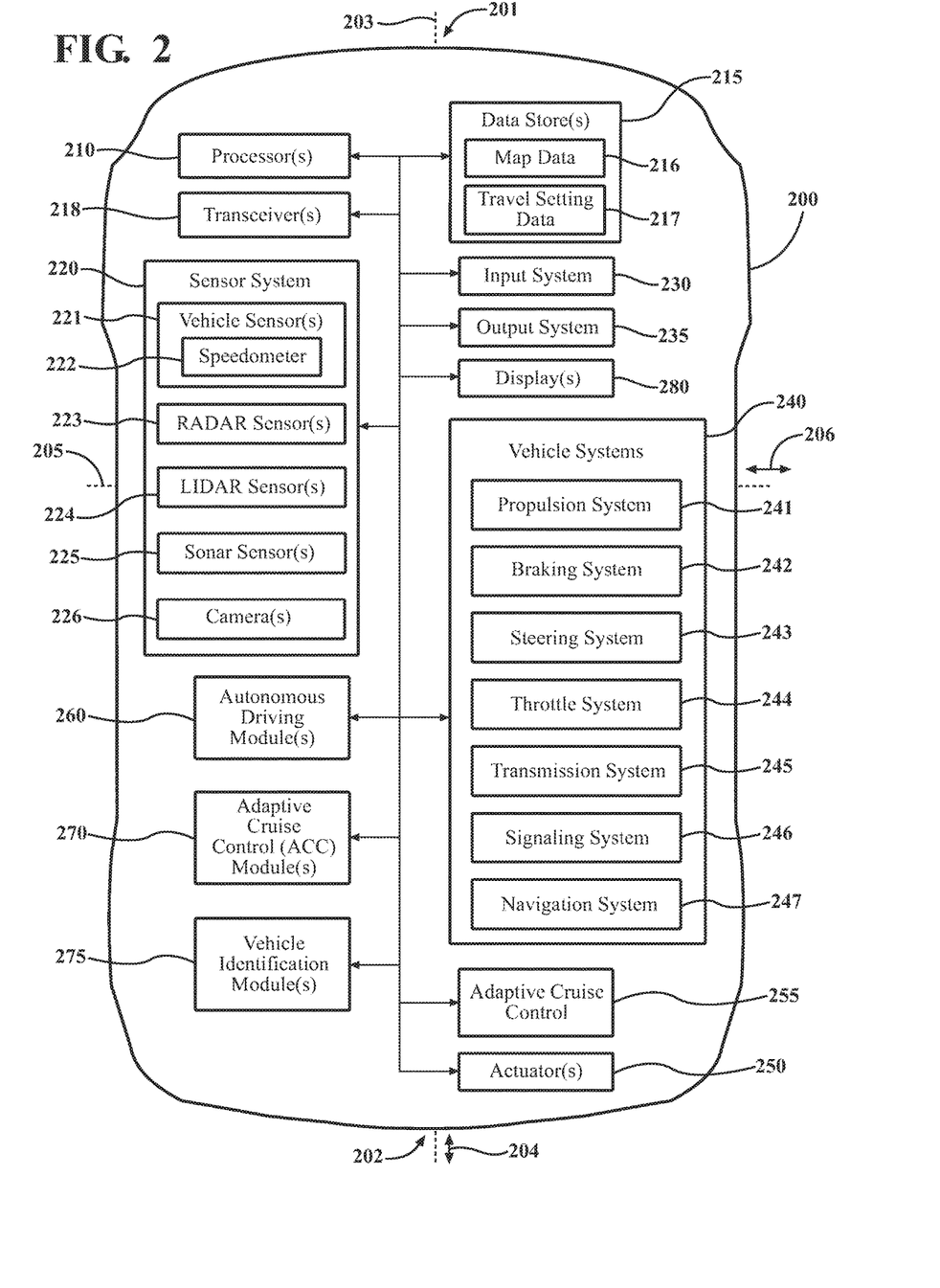
FIG. 2 is an example of a vehicle configured for implementing a travel settings communication system in accordance with an embodiment described herein.

The ego-vehicle 200 will now be described in greater detail. Referring to FIG. 2, an example ego-vehicle 200 is shown. As used herein, "vehicle" means any form of motorized transport. In one or more implementations, the ego-vehicle 200 can be an automobile. While arrangements will be described herein with respect to automobiles, it will be understood that embodiments are not limited to automobiles. In some implementations, the ego-vehicle 200 may be a watercraft, an aircraft or any other form of motorized transport. Also, it should be noted that the description of the ego-vehicle 200 can apply in whole or in part to one or more of the nearby vehicles 120.

According to arrangements herein, the ego-vehicle 200 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with a level of input from a human driver which varies with the operational mode. In one or more arrangements, the ego-vehicle 200 can be highly automated. The systems and components described herein may be configured to communicate and cooperate so as to operate the vehicle in one or more of the autonomous operational modes described below.

The ego-vehicle 200 can have a plurality of autonomous operational modes. For instance, the ego-vehicle 200 can have an unmonitored autonomous operational mode. "Unmonitored autonomous operational mode" means that one or more computing systems are used to maneuver the vehicle along a travel route with no input or supervision required from a human driver. One example of an unmonitored autonomous operational mode is described in the definition of vehicle automation Level 4 (L4), as set forth by the National Highway Traffic Safety Administration in its Preliminary Statement of Policy Concerning Automated Vehicles (May 30, 2013) ("NHTSA 2013 Policy"), which is incorporated herein by reference.

The ego-vehicle 200 can have a monitored autonomous operational mode. "Monitored autonomous operational mode" means that one or more computing systems are used to navigate and/or maneuver the vehicle with at least some human driver supervision and/or control required. One example of a monitored autonomous operational mode is described in the definition of vehicle automation Level 3 or L3, as set forth in the NHTSA 2013 Policy. In some instances, when the ego-vehicle 200 is in a monitored autonomous operational mode, a signal (e.g., an audial signal, a visual signal, a haptic signal, etc.) can be presented to a human driver to take an action within a predetermined amount of time. If such action is not taken within the predetermined amount of time, one or more safety maneuvers can be implemented.

Alternatively or in addition to the above-described modes, the ego-vehicle 200 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. Examples of semi-autonomous operational modes are described in the definition of vehicle automation Levels 2 (L2) and/or Level 1 (L1), as set forth by the NHTSA 2013 Policy. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

Alternatively or in addition to the above-described modes, the ego-vehicle 200 can have a manual operational mode. "Manual operational mode" means that a substantial majority or all of the navigation and/or maneuvering of the vehicle along a travel route is performed by a human driver with minimal or no input from (or operation of the vehicle by) a computing system. One example of a manual operational mode is described in the definition of vehicle automation Level 0 (L0), as set forth by the NHTSA 2013 Policy.

The ego-vehicle 200 can be configured to be switched between the various operational modes. Such switching can be implemented in any suitable manner, now known or later developed. The switching can be performed automatically, or it can be done responsive to receiving a manual input or request.

In some instances, the ego-vehicle 200 may be a conventional vehicle. A conventional vehicle is not configured for autonomous driving. Thus, a conventional vehicle does not have an autonomous operational mode. However, a conventional vehicle may have one or more semi-autonomous modes or features (e.g., cruise control, adaptive cruise control, lane keeping, etc.). However, in one or more arrangements, the conventional vehicle may not have semi-autonomous mode(s) or feature(s). In some instances, a conventional vehicle may be operable in only a manual operational mode. It will be appreciated that arrangements described herein are applicable to autonomous vehicles operating in any of the above-described modes, conventional vehicles, and/or other types of vehicles.

The ego-vehicle 200 can have a forward end 201 and a rearward end 202. The ego-vehicle 200 can have an associated longitudinal or fore-aft axis 203, which can be the central axis of the ego-vehicle 200. The ego-vehicle 200 can have an associated longitudinal direction 204. "Longitudinal direction" means any direction that is substantially parallel to and/or co-linear with the longitudinal axis 203. The ego-vehicle 200 can have an associated lateral axis 205, which can be substantially perpendicular to the longitudinal axis 203. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The ego-vehicle 200 can have an associated lateral direction 206. "Lateral direction" means any direction that is substantially parallel to and/or co-linear with the lateral axis 205.

The ego-vehicle 200 can include various elements. In some instances, one or more of these elements may be a part of an autonomous driving system. Some of the possible elements of the ego-vehicle 200 are shown in FIG. 2 and will now be described. It will be understood that it is not necessary for the ego-vehicle 200 to have all of the elements shown in FIG. 2 or described herein. The ego-vehicle 200 can have any combination of the various elements shown in FIG. 2. Further, the ego-vehicle 200 can have additional elements to those shown in FIG. 2. In some arrangements, the ego-vehicle 200 may not include one or more of the elements shown in FIG. 2. Further, while the various elements are shown as being located within the ego-vehicle 200 in FIG. 2, it will be understood that one or more of these elements can be located external to the ego-vehicle 200. Further, the elements shown may be physically separated by large distances.

The ego-vehicle 200 can include one or more processors 210. "Processor" means any component or group of components that are configured to execute any of the processes and/or process steps described herein or any form of process-readable instructions to carry out such processes/process steps or cause such processes/process steps to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other. In one or more arrangements, the processor(s) 210 can be a main processor of the ego-vehicle 200. For instance, the processor(s) 210 can be an electronic control unit (ECU).

The ego-vehicle 200 can include one or more data stores 215 for storing one or more types of data. The data store 215 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operatively connected to the processor(s) 210 for use thereby. The term "operatively connected," as used throughout this description, can include direct or indirect connections, including connections without direct physical contact.

In one or more arrangements, the one or more data stores 215 can include map data 216. The map data 216 can include maps of one or more geographic areas. The map data 216 can include information or data on roads, traffic control devices, road markings, structures, features, and/or landmarks in the one or more geographic areas. The map data 216 can be in any suitable form. In one or more arrangements, the map data 216 can include information related to a speed for a roadway. For example, the map data 216 can include speed limits. In some arrangements, the map data can include information on past and/or present speed information for vehicles traveling on roads. For example, the map data 216 can include average speeds for vehicles traveling on a road as compiled over a given time period. The map data 216 can be high quality and/or highly detailed.

In some instances, at least a portion of the map data 216 can be located in one or more data stores 215 located onboard the ego-vehicle 200. Alternatively or in addition, at least a portion of the data can be located in a data store or source that is located remote from the ego-vehicle 200 (for example, in a GPS system accessible through an in-vehicle GPS receiver). The data can be obtained by the ego-vehicle 200 in any suitable manner, or it can be provided by an entity (e.g., a vehicle manufacturer) for use by the ego-vehicle 200.

In one or more arrangements, the data store(s) 215 can include travel settings data 217. The travel settings data 217 can include set speed and/or set distance information for one or more of the ego-vehicle 200 and/or the nearby vehicles 120. For example, the travel settings data 217 can include the set speed 140 and/or the set distance 150 chosen for the ego-vehicle 200. Alternatively or in addition, the travel settings data 217 can include one or more of the set speeds 140*a*, 140*b* . . . 140*n* and/or the set distances 150*a*, 150*b* . . . 150*n* acquired from the nearby vehicles 120.

The ego-vehicle 200 can include one or more transceivers 218. As used herein, "transceiver" is defined as a component or a group of components that transmit signals, receive signals, or transmit and receive signals, whether wirelessly or through a hard-wired connection. The one or more transceivers 218 can be operatively connected to the one or more processors(s) 210 and/or the one or more data store(s) 215. The one or more transceivers 218 can enable communications between the ego-vehicle 200 and other elements of the system 100 described herein. The one or more transceivers 218 can be any suitable transceivers used to access a network, access point, node, or other device for the transmission and receipt of data.

The one or more transceivers 218 may be wireless transceivers using any one of a number of wireless technologies. Examples of suitable transceivers include a dedicated short-range communication (DSRC) transceiver, cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceivers 218 can include any wireless technology capable of performing, enabling and/or facilitating performance of the transceiver functions described herein. Again, the one or more transceivers 218 can be any suitable combination of transceivers, including any combination of the transceivers noted above.

The ego-vehicle 200 can include a sensor system 220. The sensor system 220 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such case, the two or more sensors can form a sensor network. The sensor system 220 and/or the one or more sensors can be operatively connected to the processor(s) 210, the data store(s) 215, and/or other element of the ego-vehicle 200 (including any of the elements shown in FIG. 1). The sensor system 220 can acquire data of at least a portion of the external environment of the ego-vehicle 200.

The sensor system 220 can include any suitable type of sensor. Various examples of different types of sensors will be described herein. However, it will be understood that the embodiments are not limited to the particular sensors described.

The sensor system 220 can include one or more vehicle sensors 221. The vehicle sensor(s) 221 can be configured to detect, determine, assess, monitor, measure, quantify and/or sense information about the ego-vehicle 200 itself. In one or more arrangements, the vehicle sensor(s) 221 can be configured to detect, determine, assess, monitor, measure, quantify and/or sense position and orientation changes of the ego-vehicle 200, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, determine, assess, monitor, measure, quantify, and/or sense one or more characteristics of the ego-vehicle 200.

In one or more arrangements, the vehicle sensor(s) 221 can include a speedometer 222. The speedometer can determine a current speed of the ego-vehicle 200, or data acquired by the speedometer can be used to determine a current speed of the ego-vehicle 200. The speedometer 222 can include any type of device, including mechanical and/or electronic speedometers. In one or more arrangements, the speedometer 222 can include (or be operatively connected to) a GPS receiver. For example, the GPS can be configured to determine how far a GPS receiver has moved position for a given time. The speedometer 222 can include components of the navigation system 247.

Alternatively or in addition, the sensor system 220 can include one or more driving environment sensors configured to acquire, detect, determine, assess, monitor, measure, quantify and/or sense driving environment data. "Driving environment data" includes and data or information about the external environment in which a vehicle is located or one or more portions thereof.

As an example, in one or more arrangements, the sensor system 220 can include one or more RADAR sensors 223. "RADAR sensor" means any device, component and/or system that can detect, determine, assess, monitor, measure, quantify and/or sense something using at least in part radio signals. The one or more RADAR sensors 223 can be configured to detect, determine, assess, monitor, measure, quantify and/or sense, directly or indirectly, the presence of one or more objects in the external environment of the ego-vehicle 200, the position of each detected object relative to the ego-vehicle 200, the distance between each detected object and the ego-vehicle 200 in one or more directions (e.g. in the longitudinal direction 204, the lateral direction 206 and/or other direction(s)), the elevation of each detected object, the speed of each detected object and/or the movement of each detected object. The one or more RADAR sensors 223, or data obtained thereby, can determine the speed of objects in the external environment of the ego-vehicle 200.

In one or more arrangements, the sensor system 220 can include one or more LIDAR sensors 224. "LIDAR sensor" means any device, component and/or system that can detect, determine, assess, monitor, measure, quantify and/or sense objects using at least in part lasers. The LIDAR sensor can include a laser source and/or laser scanner configured to emit a laser signal and a detector configured to detect reflections of the laser signal. The one or more LIDAR sensors 224 can be configured to detect, determine, assess, monitor, measure, quantify and/or sense, directly or indirectly, the presence of one or more objects in the external environment of the ego-vehicle 200, the position of each detected object relative to the ego-vehicle 200, the distance between each detected object and the ego-vehicle 200 in one or more directions (e.g. in the longitudinal direction 204, the lateral direction 206 and/or other direction(s)), the elevation of each detected object, the speed of each detected object, and/or the movement of each detected object.

In one or more arrangements, the sensor system 220 can include one or more sonar sensors 225. "Sonar sensor" means any device, component and/or system that can detect, determine, assess, monitor, measure, quantify and/or sense something using at least in part sound waves. The one or more sonar sensors 225 can be configured to detect, determine, assess, monitor, measure, quantify and/or sense, directly or indirectly, the presence of one or more objects in the external environment of the ego-vehicle 200, the position of each detected object relative to the ego-vehicle 200, the distance between each detected object and the ego-vehicle 200 in one or more directions (e.g. in the longitudinal direction 204, the lateral direction 206 and/or other direction(s)), the elevation of each detected object, the speed of each detected object, and/or the movement of each detected object.

The sensor system 220 can include can include one or more cameras 226. "Camera" includes any device(s), component(s), and/or system(s) that is configured to capture visual data. "Visual data" includes video and/or image information/data. The visual data can be in any suitable form. In one or more arrangements, one or more of the cameras 226 can be oriented, positioned, configured, operable, and/or arranged to capture visual data from at least a portion of the external environment of the ego-vehicle 200. Visual data acquired by the one or more cameras 226 can be used to detect, determine, assess, monitor, measure, quantify and/or sense, directly or indirectly, the presence of one or more objects in the external environment of the ego-vehicle 200, the position of each detected object relative to the ego-vehicle 200, the distance between each detected object and the ego-vehicle 200 in one or more directions, the elevation of each detected object, the speed of each detected object, and/or the movement of each detected object.

The sensor system 220, the processor(s) 210, and/or one or more other elements of the ego-vehicle 200 can be operable to control operation of one or more of the sensors of the sensor system 220. It should be noted that any of the sensors described herein can be provided in any suitable location with respect to the ego-vehicle 200. For instance, one or more sensors can be located within the ego-vehicle 200, one or more sensors can be located on the exterior of the ego-vehicle 200 and/or one or more sensors can be located so as to be exposed to the exterior of the ego-vehicle 200.

Alternatively or in addition to one or more of the above examples, the sensor system 220 can include one or more sensors configured to detect, determine, assess, monitor, measure, quantify and/or sense the location of the ego-vehicle 200 and/or the location of objects in the environment relative to the ego-vehicle 200. Any suitable sensor can be used for such purposes. Such sensors may work independently and/or in combination with a positioning system of the ego-vehicle 200.

The ego-vehicle 200 can include an input system 230. An "input system" includes any device, component, system, element or arrangement or groups thereof that enable information/data to be entered into a machine. The input system 230 can receive an input from a vehicle occupant (e.g. a driver or a passenger). Any suitable input system 230 can be used, including, for example, a keypad, display, touch screen, multi-touch screen, button, joystick, mouse, trackball, microphone and/or combinations thereof.

The ego-vehicle 200 can include an output system 235. An "output system" includes any device, component, system, element or arrangement or groups thereof that enable information/data to be presented to a vehicle occupant (e.g. a person, a vehicle occupant, etc.). The output system 235 can present information/data to a vehicle occupant.

In one or more arrangements, the input system 230 and/or the output system 235 can include one or more displays 280. "Display" is defined as a component or a group of components that present information/data in a form that is perceptible to the human sense of sight. For instance, the display 280 can present video, images, graphics, etc. The display 280 can be configured to receive inputs form a user. For instance, the display 280 can include a keypad, display, touch screen, multi-touch screen, button, joystick, mouse, trackball, microphone and/or combinations thereof. The display 280 can be any suitable type of display. For instance, the display 280 can be a liquid crystal display (LCD), a light emitting diode (LED) display or some other suitable display. In one or more arrangements, the display 280 can be a heads-up display, a display for a navigation system, and/or a display included in an instrument cluster. The display(s) 280 can be provided in any suitable location within the ego-vehicle 200. In one or more arrangements, the display(s) 280 can be located in a front interior portion of the ego-vehicle 200. As an example, the display(s) 280 can be included in a dashboard or instrument panel (not shown) of the ego-vehicle 200.

The ego-vehicle 200 can include one or more modules, at least some of which will be described herein. Each module can be implemented as computer readable program code that, when executed by a processor, implement one or more of the various processes or functions described herein. One or more of the modules can be a component of the processor(s) 210, or one or more of the modules can be executed on and/or distributed among other processing systems and/or elements to which the processor(s) 210 is operatively connected. The modules can include instructions (e.g., program logic) executable by one or more processor(s) 210. Alternatively or in addition, one or more data stores 215 may contain such instructions.

In one or more arrangements, one or more of the modules described herein can include artificial or computational intelligence elements, e.g., neural network, fuzzy logic or other machine learning algorithms. Further, in one or more arrangements, the hardware and/or software elements configured for performing the functions of a particular module may be distributed among a plurality of elements and/or locations. In one or more arrangements, two or more of the modules described herein can act effectively as a single module for purposes of performing the functions and/or processes described herein.

In the examples where the ego-vehicle 200 is an autonomous vehicle, the ego-vehicle 200 can include one or more autonomous driving modules 260. The autonomous driving module(s) 260 can receive data from the sensor system 220, the input system 230, and/or any other type of system capable of capturing information relating to the ego-vehicle 200 and/or the external environment of the ego-vehicle 200. The autonomous driving module(s) 260 can determine position and velocity of the ego-vehicle 200. The autonomous driving module(s) 260 can determine the location of obstacles, objects, or other environmental features including traffic signs, trees, shrubs, neighboring vehicles, pedestrians, etc.

The autonomous driving module(s) 260 can be configured to receive, capture, and/or determine location information for objects within the external environment of the ego-vehicle 200 for use by the processor(s) 210 and/or one or more of the modules described herein, in estimating the position and orientation of the ego-vehicle 200. The estimated position of ego-vehicle 200 may be given in global coordinates based on signals from a plurality of satellites, or based on any other data and/or signals that could be used to determine the current state of the ego-vehicle 200 or determine the position of the ego-vehicle 200 in respect to its environment. The estimated vehicle position may be used for either creating a map or determining the position of the ego-vehicle 200 in respect to existing map data.

The ego-vehicle 200 can include one or more adaptive cruise control (ACC) modules 270. The ACC module(s) 270 can be configured to send and/or acquire travel setting information. As used herein, "travel settings" and "travel setting information" can include any information related to the travel of a vehicle. In one or more arrangements, the travel setting information includes set speed and/or set distance information of a nearby vehicle 120. In some arrangements, the ACC module(s) 170 can acquire set speed and/or set distance information from one or more nearby vehicles 120. Alternatively or in addition, the ACC module(s) 270 can be configured to send set speed and set distance information (relating to the ego-vehicle 200 and/or to other vehicles) to one or more components in the communication system 100. In one or more arrangements, and described below, the ACC module(s) 270 can use such information to control the adaptive cruise control 255 of the ego-vehicle 200.

In one or more arrangements, the ACC module(s) 270 can be configured to estimate the travel settings for one or more nearby vehicles 120. For instance, the travel settings can be estimated based on the past, present, and/or future travel of a nearby vehicle 120. For example, if a speed of a nearby vehicle 120 does not vary much over time, it can be determined that the nearby vehicle 120 is operating under a cruise control mode. An average speed of the nearby vehicle 120 can be used as an estimated set speed. It is appreciated that other factors can be used to estimate travel settings. For instance, a vehicle type (such as size of vehicle, truck vs. car, commercial vs. individual, etc.), weather conditions, road conditions, and/or operator characteristics can be used in estimating travel settings of a nearby vehicle 120.

In one or more arrangements, the ACC module(s) 270 can be configured to present the acquired travel setting information within the ego-vehicle 200. For instance, a set speed and a set distance for the one or more nearby vehicles 120 can be presented in the ego-vehicle 200. In some arrangements, the set speed and/or set distance can be acquired either from the nearby vehicle 120 directly, or from an estimation as described above. The set speed and/or set distance can be presented as an absolute measurement and/or a relative measurement. As used herein, "absolute" can include any measurement made with respect to a predetermined reference point or scale. "Relative" as used in connection with the travel settings can include measurements made with respect to an arbitrary or relative scale. For example, a relative set speed or set distance for a nearby vehicle 120 can be measured with respect to the speed or distance of the ego-vehicle 200.

The autonomous driving module(s) 260 and/or the ACC module(s) 270 can be configured to determine travel path(s), current driving maneuvers for the ego-vehicle 200, future driving maneuvers and/or modifications to current driving maneuvers based on data acquired by the sensor system 220, the processor(s) 210, travel setting information, and/or data from any other suitable source. "Driving maneuver" means one or more actions that affect the movement of a vehicle. Examples of driving maneuvers include: accelerating, decelerating, braking, turning, moving in a lateral direction of the ego-vehicle 200, changing travel lanes, merging into a travel lane, and/or reversing, just to name a few possibilities. The autonomous driving module(s) 260 and/or the ACC module(s) 270 can be configured to implement determined driving maneuvers. The autonomous driving module(s) 260 can cause, directly or indirectly, such autonomous driving maneuvers to be implemented. The ACC module(s) 270 can cause, directly or indirectly, cruise control maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 260 and/or the ACC module(s) 270 can be configured to execute various vehicle functions and/or to transmit data to, receive data from, interact with, and/or control the ego-vehicle 200 or one or more systems thereof (e.g. one or more of vehicle systems 240) for purposes of performing the functions of the modules 260 and 270.

The ego-vehicle 200 can include one or more vehicle identification module(s) 275. The vehicle identification module(s) 275 can be configured to determine whether a detected object in the external environment of the ego-vehicle 200 is a vehicle. For instance, the vehicle identification module(s) 275 can analyze, review, or otherwise process information/data received from one or more sensors of the sensor system 220. In some arrangements, the vehicle identification module(s) 275 can be configured to identify the nature of the objects (e.g., whether the object is a vehicle) using any suitable technique, including, for example, template matching and other kinds of computer vision and/or image processing techniques and/or other artificial or computational intelligence algorithms or machine learning methods.

The vehicle identification module(s) 275 can include any suitable vehicle recognition software or other object recognition software. The vehicle recognition software can analyze visual or other data captured by the sensor system 220. The vehicle recognition software can query the vehicle image database for possible matches. For instance, images captured by the sensor system 220 can be compared to images in the vehicle image database for possible matches.

Alternatively or in addition, measurements or other aspects of an image captured by the sensor system 220 can be compared to measurements or other aspects of any images in the vehicle image database. The vehicle identification module(s) 275 can identify the detected object as a particular type of vehicle if there is a match between the captured image and an image in the vehicle database.

The vehicle identification module(s) 275 can be configured to detect an identifying information for nearby vehicles detected in the external environment so that the ego-vehicle 200 may acquire travel settings for the detected vehicles. The vehicle identification module(s) 275 can be configured to analyze, assess and/or interpret information about a detected vehicle in the external environment of the ego-vehicle 200. Thus, the vehicle identification module(s) 275 can be configured to detect and/or recognize identifiers of a vehicle. Examples of identifiers include a license plate, a VIN (vehicle identification number), an identifier signal transmitted by a detected vehicle, bar code, QR code, or other unique identifier. When an identifier is detected, such information can be used by the ACC module 270 to request travel settings associated with the identifier.

The ego-vehicle 200 can include one or more vehicle systems 240. Various examples of the one or more vehicle systems 240 are shown in FIG. 2. However, the ego-vehicle 200 can include more, fewer, or different vehicle systems. It should be appreciated that although particular vehicle systems are separately defined, each or any of the systems or portions thereof may be otherwise combined or segregated via hardware and/or software within the ego-vehicle 200. The ego-vehicle 200 can include a propulsion system 241, a braking system 242, a steering system 243, throttle system 244, a transmission system 245, a signaling system 246, and/or a navigation system 247. Each of these systems can include one or more mechanisms, devices, elements, components, sub-systems, and/or combination thereof, now known or later developed.

The processor(s) 210, the autonomous driving module(s) 260, and/or the ACC module(s) 270 can be operatively connected to communicate with the various vehicle systems 240 and/or individual components thereof. For example, returning to FIG. 1, the processor(s) 210, the autonomous driving module(s) 260, and/or the ACC module(s) 270 can be in communication to send and/or receive information from the various vehicle systems 240 to control the movement, speed, maneuvering, heading, direction, etc. of the ego-vehicle 200. The processor(s) 210, the autonomous driving module(s) 260, and/or the ACC module(s) 270 may control some or all of these vehicle systems 240.

The processor(s) 210, the autonomous driving module(s) 260, and/or the ACC module(s) 270 may be operable to control the navigation and/or maneuvering of the ego-vehicle 200 by controlling one or more of the vehicle systems 240 and/or components thereof. For instance, when operating in an autonomous mode, the processor(s) 210, the autonomous driving module(s) 260, and/or the ACC module(s) 270 can control the direction and/or speed of the ego-vehicle 200. The processor(s) 210, the autonomous driving module(s) 260, and/or the ACC module(s) 270 can cause the ego-vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels).

In some instances, such as when the ego-vehicle 200 is an autonomous vehicle, the ego-vehicle 200 can include one or more actuators 250. The actuators 250 can be any element or combination of elements operable to modify, adjust and/or alter one or more of the vehicle systems 240 or components thereof to responsive to receiving signals or other inputs from the processor(s) 210, the autonomous driving module(s) 260, and/or the ACC module(s) 270. Any suitable actuator can be used. For instance, the one or more actuators 250 can include motors, pneumatic actuators, hydraulic pistons, relays, solenoids, and/or piezoelectric actuators, just to name a few possibilities. However, when the ego-vehicle 200 is a conventional vehicle, the ego-vehicle 200 may or may not include the one or more actuators 250.

The ego-vehicle 200 can include an adaptive cruise control system 255. The adaptive cruise control system 255 can include one or more components, systems, modules, devices, and/or elements that can be activated to maintain a minimum distance between the ego-vehicle 200 and a leading vehicle. The adaptive cruise control system 255 can also attempt to maintain a speed set by the driver. The adaptive cruise control system 255 can automatically control and/or adjust the speed of the ego-vehicle 200 to maintain the minimum distance from a leading vehicle based on data received from the sensor system 220. When the adaptive cruise control system 255 is in use, the vehicle may otherwise be operated manually by a human driver (e.g., steering). Upon receiving a driver input to alter the speed of the vehicle (e.g. by depressing the brake pedal to reduce the speed of the vehicle), the adaptive cruise control system 255 can be deactivated and the speed of the ego-vehicle 200 becomes manually controlled. The adaptive cruise control system 255 can include one or more user interface elements to enable a vehicle occupant (e.g., a driver) to selectively activate and deactivate the adaptive cruise control system 255. The adaptive cruise control system 255 can be any adaptive cruise control system, now known or later developed.

According to arrangements herein, the ego-vehicle 200 can be configured to present a vehicle occupant (e.g., the driver) with travel setting information for the nearby vehicles 120. As mentioned above, the travel setting information can include set speeds and/or set distances for the nearby vehicles 120. The travel setting information can be provided in any suitable manner, such as visually and/or audibly. Based on the presented travel setting information, a vehicle occupant can select which, if any, of the nearby vehicles 120 that it would like for the ego-vehicle 200 to be operated relative to. For example, the vehicle occupant can select which of the nearby vehicle(s) 120 that it wishes for the ego-vehicle 200 to follow.

In one arrangement, when a vehicle occupant activates the adaptive cruise control system 255, the vehicle can automatically acquire and/or present the travel setting information for the nearby vehicles 120. Based at least in part on the travel setting information, the vehicle occupant can decide whether or not to use the adaptive cruise control and/or which nearby vehicle should be followed when the adaptive cruise control is implemented. Further, the travel setting information can be used to alter, modify, or adjust the distance at which the ego-vehicle 200 follows the nearby vehicle. For instance, if the selected vehicle has a high set speed and/or a short set distance, a larger following distance can be employed.

Alternatively or in addition, the ego-vehicle 200 may not require the driver to select which vehicle to follow. In this arrangement, the ego-vehicle 200 can contain logic for choosing the vehicle that most closely matches the driver's input travel settings. For example, the processor(s) 210, the autonomous driving module(s) 260, and/or the ACC module(s) 270 can select, or cause to be selected, a vehicle to follow. The vehicle may display to the driver the surrounding vehicles travel settings as well as the one chosen to be followed.

Now that the various potential systems, devices, elements and/or components of the system 100 and the ego-vehicle 200 have been described, various methods of displaying travel information for nearby vehicles will now be described. The method 300 illustrated in FIG. 3 may be applicable to the embodiments described above in relation to FIG. 1, but it is understood that the method 300 can be carried out with other suitable systems and arrangements. Moreover, the methods may include other steps that are not shown here, and in fact, the methods are not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

Figure 3:
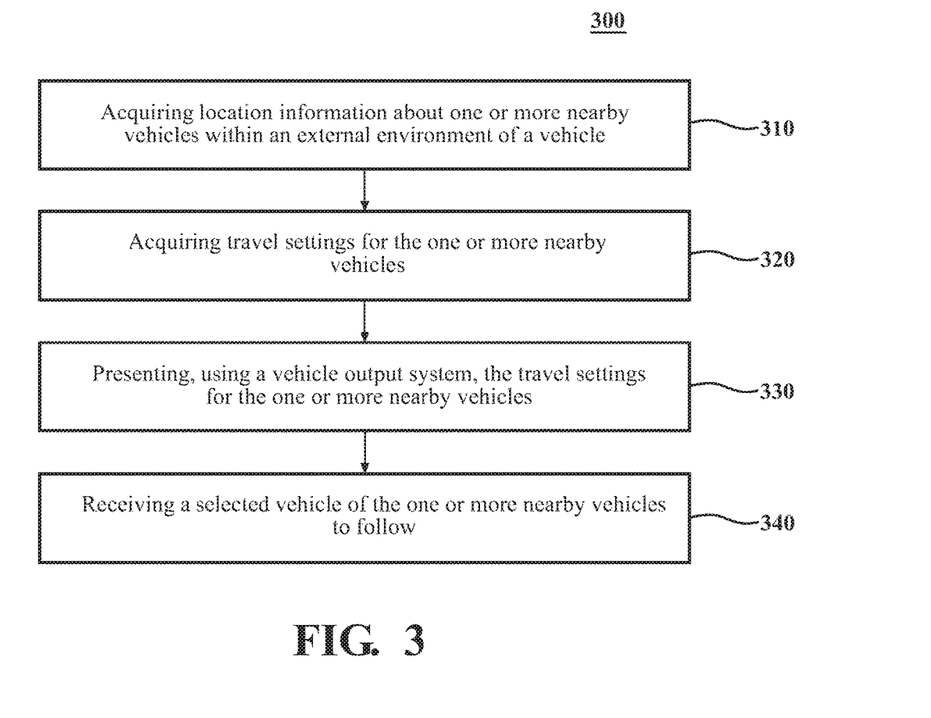
FIG. 3 is an example of a method of presenting travel settings of nearby vehicles for the selection of a vehicle to follow.

Referring now to FIG. 3, a first example of a method of presenting travel settings of nearby vehicles for the selection of a vehicle to follow is shown. Various possible steps of method 300 will now be described. At block 310, location information about one or more nearby vehicles within an external environment of the vehicle can be acquired. "Location information" can include any information relating to a location of the one or more nearby vehicles. In one or more arrangements, the location information can be acquired directly from the one or more nearby vehicles 120. For example, position data (e.g., latitude and longitude) can be determined by a GPS system of the nearby vehicle 120 and acquired by the ego-vehicle 200 via DSRC. In one or more arrangements, the location information can be acquired from one or more sensors within the sensor system 220, the vehicle identification module(s) 275, and/or the map data 216. For example, the acquiring of the location information for the one or more nearby vehicles can include sensing the external environment of the ego-vehicle 200 to detect one or more nearby vehicles. The acquiring can further include identifying the detected one or more nearby vehicles using identifiers. The acquiring can further include relating GPS coordinates of the one or more nearby vehicles to the current GPS coordinates of the ego-vehicle 200, do determine the locations of the nearby vehicles with respect to the ego-vehicle 200. When the ego-vehicle 200 is an autonomous vehicle, the acquiring can be performed while the ego-vehicle 200 is operating in an autonomous operational mode or in any other operational mode that the ego-vehicle 200 is configured to operate in (e.g., semi-autonomous, manual, special, etc.). Further, the location information can be acquired from one or more autonomous vehicle systems. The acquiring can be performed continuously, periodically, irregularly, or even randomly. The method 300 can continue to block 320.

At block 320, travel settings for the one or more nearby vehicles can be acquired. In one or more arrangements, the travel settings can include set speed and/or set distance information for each nearby vehicle. For instance, for nearby vehicles 102a, 102b . . . 102n the set speeds 140a, 140b . . . 140n and the set distances 150a, 150b . . . 150n can be acquired. In one or more arrangements, the set speeds 140a, 140b . . . 140n and/or the set distances 150a, 150b . . . 150n can be acquired directly from the nearby vehicles 102a, 102b . . . 102n. For example, the nearby vehicles 120 can include autonomous driving module(s) and/or ACC module(s) that can determine and/or provide a set speed and/or set distance. In some instances, a navigation system of the nearby vehicles 120 can determine and/or provide a set speed and/or set distance. The set speeds and/or set distances can be acquired over a DSRC network. Alternatively or in addition, the set speeds and/or set distances can be acquired from an external travel setting information source 130. Alternatively or in addition, the travel settings can be acquired through an estimation. For example, the processor(s) 210 and/or the ACC module(s) 270 can estimate a set speed and/or set distance of one or more of the nearby vehicles 102a, 102b . . . 102n. In some arrangements, the estimating can be based on information received by the sensor system 220. The acquiring can be performed continuously, periodically, irregularly, or even randomly. The method 300 can continue to block 330.

At block 330, the travel settings for the one or more nearby vehicles 120 can be presented or can be caused to be presented within the ego-vehicle 200. In one or more arrangements, a set speed and/or set distance can be presented in the display 280 of the ego-vehicle 200. Such causing can be performed by one or more elements of the ego-vehicle 200, such as the ACC module(s) 170 and/or the processor(s) 210. The presentation can be done on one or more elements of the output system 135, such as the one or more displays 280. The set speed and/or set distance can be presented in any suitable form. In some instances, the set speed and/or set distance can be presented numerically within a vehicle icon. The numerical presentation can represent an absolute set speed and/or absolute set distance. Alternatively or in addition, the numerical presentation can represent a relative set speed and/or relative set distance. For example, the presented set speed can be a speed relative to the ego-vehicle 200. The presented set distance can be a distance relative to a planned routed distance for the ego-vehicle 200. Such a presentation can be made continuously, periodically, irregularly, or even randomly. The presentation can be updated in real-time.

In one or more arrangements, the travel settings can be presented in such a way that allows the selection of one or more of the nearby vehicles. For example, the presenting can be achieved through the graphical displays shown in the example of FIG. 5. The presenting can include a graphical icon, such as vehicle icons 520a, 520b, 520c, 520d, for each selectable nearby vehicle.

At block 340, a selected vehicle of the one or more nearby vehicles to follow can be received. In some arrangements, a vehicle occupant can select a vehicle to follow. The vehicle occupant can be a driver of the ego-vehicle 200. The selection can be based on the acquired travel settings for the one or more nearby vehicles 120. In one or more arrangements, the selection can be received via one or more elements of the input system 230. For example, the one or more displays 280 can receive a selection from the vehicle occupant. Selection may be made, for example, by touching the display over a vehicle icon when the display is in the form of a touch screen. Alternatively or in addition, the selection of the vehicle to follow can be made by one or more components of the ego-vehicle 200. For instance, the processor(s) 210, the autonomous driving module(s) 260, and/or the ACC module(s) 270 can select a vehicle to follow. For instance, the selection can be based on travel settings for a nearby vehicle 120 that most closely matches the ego-vehicle's travel setting data 217. The method 300 can continue to block 350.

The method 300 can end. Alternatively, the method 300 can return to block 310. In one or more arrangements, the method 300 (or any one or more of the above-described blocks thereof) can be performed in response to receiving an input from a vehicle occupant to activate the adaptive cruise control system 255. In this way, the vehicle occupant can decide whether or not to continue with the use of the adaptive cruise control system 255 based on the presented travel settings.

Figure 4:
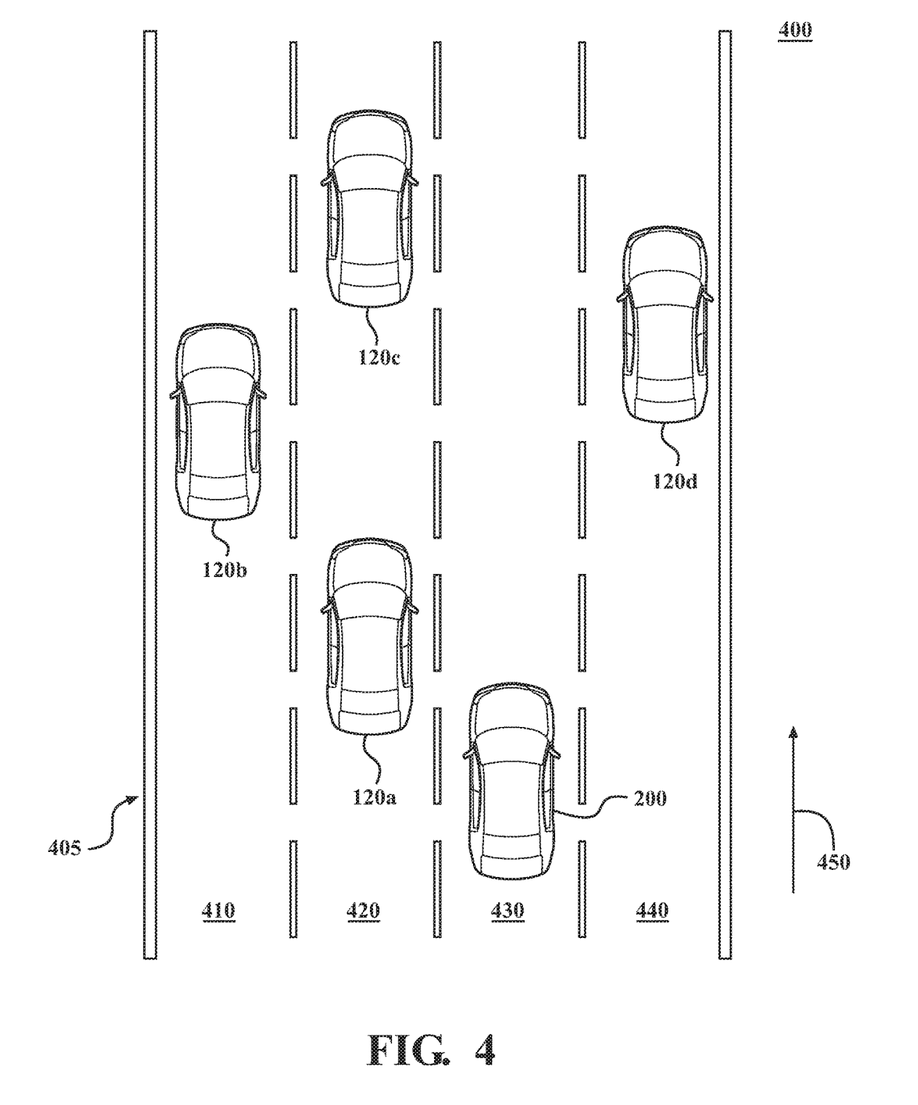
FIG. 4 is an example of a scenario in which the vehicle encounters a plurality of nearby vehicles.

Various non-limiting examples of displaying set speed and/or set distance information in the ego-vehicle 200 will now be described with reference to FIGS. 4 and 5. For purposes of this example, the ego-vehicle 200 can be traveling in an environment 400. The ego-vehicle 200 can be traveling on a road 405. For this example, the road can include a first travel lane 410, a second travel lane 420, a third travel lane 430, and a fourth travel lane 440. For purposes of this example, vehicles in the travel lanes 410, 420, 430, 440 can move in or can be designated to move in a travel direction 440. While FIGS. 4 and 5 show an example in which the road 405 includes four travel lanes, it will be understood that arrangements described herein are not limited to roads having four travel lanes.

Figure 5:
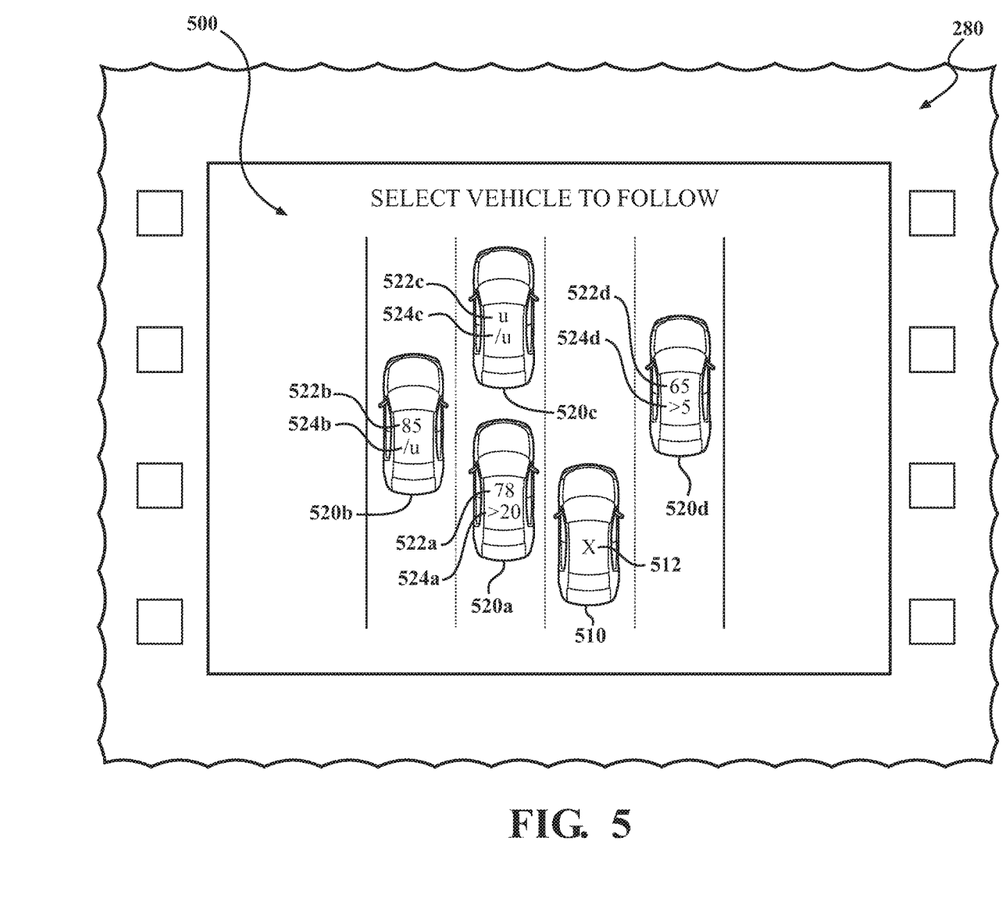
FIG. 5 is an example of a display presenting travel settings with respect to the plurality of nearby vehicles in the scenario of FIG. 4.

At the moment shown in FIG. 5, the current travel lane of the ego-vehicle 200 can be the third travel lane 430. The ego-vehicle 200 can sense the environment 400, such as by using one or more sensors in the sensor system 220. The ego-vehicle 200 can detect the presence of one or more objects, such as nearby vehicles 120*a*, 120*b*, 120*c*, and 120*d* in the environment 400. In some instances, the ego-vehicle 200 can determine that the detected object(s) are vehicles based on one or more factors. For instance, the vehicle identification module(s) 275 and/or the processor(s) 210 can review, assess, analyze, and/or process data about the objects, as acquired by the sensor system 220.

An identifier for each of the nearby vehicles 120*a*, 120*b*, 120*c*, 120*d* can be detected and/or determined. Such identifying can be performed in any suitable manner. For instance, data about the nearby vehicles 120*a*, 120*b*, 120*c*, 120*d* can be acquired by the sensor system 220. The acquired data can be analyzed, by the vehicle identification module(s) 275 and/or the processor(s) 210, to detect a vehicle identifier (e.g., a license plate number, VIN, etc.). For instance, visual data acquired by the camera(s) 226 can be analyzed to detect a license plate. The identifier can be detected in other ways. As an example, one or more of the nearby vehicles 120*a*, 120*b*, 120*c*, 120*d* can transmit a vehicle identifier to the ego-vehicle 200. For instance, one or more of the nearby vehicles 120*a*, 120*b*, 120*c*, 120*d* can transmit a signal beacon on any suitable basis (e.g., continuously, periodically, irregularly, etc.).

Set speed and/or set distance information for one or more of the nearby vehicles 120*a*, 120*b*, 120*c*, 120*d* can be acquired by the ego-vehicle 200. For instance, the ego-vehicle 200 can send a request for set speed and set distance information to the non-vehicular travel setting information source(s) 130. The ego-vehicle 200 can alternatively (or additionally) send a request for set speed and set distance information to the one or more nearby vehicles 120*a*, 120*b*, 120*c*, 120*d*. The request can include one or more vehicle identifiers to facilitate obtaining the correct information. The set speed and/or set distance information can be received from any suitable source. In one or more arrangements, the set speed and/or set distance information can be received directly from the one or more vehicles in the external environment. Alternatively or in addition, the set speed and/or set distance information can be received from remote server(s) and/or data store(s).

The ego-vehicle 200 can be configured to present or cause to be presented the set speed and/or set distance information within the ego-vehicle 200. For purposes of this example, the set speed and/or set distance information can be presented in a visual manner. The set speed and/or set distance information can be presented on a display within the ego-vehicle 200.

One example of the set speed and/or set distance information presented on the display 280 is shown in FIG. 5. The set speed and/or set distance information can be presented in a user-friendly format. For instance, a graphical representation 500 of the environment 400 can be shown. The graphical representation 500 can include a vehicle icon 510 to represent the ego-vehicle 200. The vehicle icon 510 can include identification 512 to provide indication that the icon corresponds to the ego-vehicle 200. For example, the identification 512 can include an "X" located within the vehicle icon 510 as shown in FIG. 5. The graphical representation 500 can include nearby vehicle icons 520*a*, 520*b*, 520*c*, 520*d* to represent nearby vehicles 120*a*, 120*b*, 120*c*, 120*d*, respectively. There may also be graphical representation of the road and/or the travel lanes. The vehicle icons 520*a*, 520*b*, 520*c*, 520*d* of the nearby vehicles in the surrounding environment can be arranged on the display 280 relative to each other and/or relative to the vehicle icon 510 of the ego-vehicle 200, in a manner that generally corresponds to their actual relative actual locations on the road.

The set speed and/or set distance information for each nearby vehicle 120*a*, 120*b*, 120*c*, 120*d* can be associated with the respective vehicle icon 520*a*, 520*b*, 520*c*, 520*d* in any suitable manner. In the example shown, the set speed information 522*a*, 522*b*, 522*c*, 522*d* can be presented within the associated vehicle icons 520*a*, 520*b*, 520*c*, 520*d*. In some instances, the set speed information 522*a*, 522*b*, 522*c*, 522*d* can be updated dynamically in real-time or any suitable interval. In the example of FIG. 5, the set distance information 524*a*, 524*b*, 524*c*, 524*d* can be presented within the associated vehicle icons 520*a*, 520*b*, 520*c*, 520*d*. In some instances, the set distance information 524*a*, 524*b*, 524*c*, 524*d* can be updated dynamically in real-time or any suitable interval.

In this example, the set speed and the set distance information are presented as numerical values. In one or more arrangements, the set speed can correspond to an absolute speed. For example, the set speed can be measured in units of distance traveled for a given time period (e.g., mph, kph). However, it will be understood that arrangements are not limited to presenting set speed information in this format. Alternatively or in addition, the set speed may be displayed in relative terms. For example, the set speed can be shown relative to a speed of the ego-vehicle 200. In some instances, the set speed information may not be available for a nearby vehicle, such as due to poor communication with the nearby vehicle, no set speed has been determined by a user and/or vehicle systems, an inability access or receive the driving rating information, and/or for any other reason. In such instances, a suitable indicator can be provided as to such status. In this example, the set speed is unavailable for the nearby vehicle 120*c*. Accordingly, a "u" symbol or other indicator can be used as the set speed information 522*c* with the associated vehicle icon 520*c*.

In one or more arrangements, the set distance can correspond to an absolute distance. For example, the set distance can be measured in units of distance (e.g., miles, kilometers). However, it will be understood that arrangements are not limited to presenting set distance information in this format. Alternatively or in addition, the set distance may be displayed in relative terms. For example, the set distance can be shown relative to a set distance of the ego-vehicle 200. In one or more arrangements, the acquired set distance can be in the form of a range of distances. For example, the set distance can be a range below a certain value (e.g., less than 5 miles), a range above a certain value (e.g., greater than 20 miles), or a range between two values (e.g., 10-15 miles). In some instances, the set distance information may not be available for a nearby vehicle, such as due to poor communication with the nearby vehicle, no set distance has been determined by a user and/or vehicle systems, an inability access or receive the driving rating information, and/or for any other reason. In such instances, a suitable indicator can be provided as to such status. In this example, the set distance is unavailable for the nearby vehicles 120b and 120c. Accordingly, a "u" symbol or other indicator can be used as the set distance information 524b and 524c with the associated vehicle icons 520b and 520c.

A vehicle occupant (e.g., a driver) can view the set speed and/or set distance information. In one or more arrangements, the vehicle occupant can select one of the nearby vehicles 120a, 120b, 120c, 120d that it wishes the ego-vehicle 200 to follow. The selection can be made in any suitable manner. For instance, when the display 280 is a touch screen display, the vehicle occupant can select the desired vehicle by pressing the vehicle icon 520a, 520b, 520c, 520d using a finger, stylus, or other implement. Alternatively, the vehicle occupant can provide an audible input, indicating which one of the nearby vehicles 120a, 120b, 120c, 120d should be selected. In some arrangements, the selection of a vehicle to follow can be made by one or more components of the ego-vehicle 200, as described above.

In one or more arrangements, the selected vehicle can be presented or can be caused to be presented within the ego-vehicle 200. In one or more arrangements, the selected vehicle can be presented in the display 280 of the ego-vehicle 200. Such causing can be performed by one or more elements of the ego-vehicle 200, such as the ACC module(s) 170 and/or the processor(s) 210. The presentation can be done on one or more elements of the output system 135, such as the one or more displays 280. The selected vehicle can be presented in any suitable form. For example, the selected vehicle can be highlighted, outlined, made brighter, made larger, or otherwise indicated as the selected vehicle. Such a presentation can be made continuously, periodically, irregularly, or even randomly. The presentation can be updated in real-time.

In response to receiving the selection, the ego-vehicle 200 can be caused to implement one or more driving maneuvers relative to the selected vehicle. In one or more arrangements, the ego-vehicle 200 can be caused to follow the selected vehicle. Referring to FIG. 5, the ego-vehicle 200 can be caused to switch travel lanes if necessary to follow the selected vehicle. Further, the speed of the ego-vehicle 200 can be changed to follow the selected vehicle. The autonomous driving module(s) 260, the ACC module(s) 270, and/or the processor(s) 210 can send a signal to one or more actuators 250 and/or one or more vehicle systems 240 to implement the appropriate driving maneuvers.

The ego-vehicle 200 can follow the selected vehicle at a predetermined following distance. In one or more arrangements, the predetermined following distance can be a fixed distance. In one or more arrangements, the predetermined following distance can be variable based at least in part on the set speed and/or set distance information associated with the selected vehicle. For instance, if the set distance of the selected vehicle is less than a travel distance desired for the ego-vehicle 200, the following distance can be greater in anticipation of the selected vehicle exiting a roadway.

In some instances, none of the nearby vehicles 120a, 120b, 120c, 120d can be selected to follow. In such case, the ego-vehicle 200 can continue to be operated as it is currently being operated. Alternatively, if no selection is received, a special mode can be implemented. In the special mode, the ego-vehicle 200 can automatically select one of the nearby vehicles 120a, 120b, 120c, 120d based on the set speed and/or set distance information for the nearby vehicles 120a, 120b, 120c, 120d. The automatic selection can be based on any suitable criteria. For instance, a nearby vehicle having the closest set speed to the speed of travel of the ego-vehicle 200 can be automatically selected. Alternatively, a nearby vehicle having the closest set distance to a planned distance for the ego-vehicle 200 can be automatically selected. Such selection can be performed by the ACC module(s) 270, the autonomous driving module(s) 260, and/or the processor(s) 210. In some stances, the ego-vehicle 200 may prompt the vehicle occupant for approval.

It will be appreciated that arrangements described herein can provide numerous benefits, including one or more of the benefits mentioned herein. For example, arrangements described herein can provide information to a vehicle driver to allow them to make informed decisions. For example, arrangements can display the set speed and/or set distance of nearby vehicles. Arrangements described herein can help a human driver select which nearby vehicle that it should follow. Arrangements herein can provide the information to a vehicle occupant in a user-friendly manner that can be easily and quickly understood. Arrangements described herein can also provide a degree of comfort and confidence to vehicle occupants and/or improve vehicle safety.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An adaptive cruise control system for presenting travel settings of nearby vehicles for a selection of a vehicle to follow, comprising:
   one or more processors; and
   a memory communicably coupled to the one or more processors and storing:
   a vehicle identification module including instructions that when executed by the one or more processors cause the one or more processors to acquire location information about one or more nearby vehicles within an external environment of a vehicle, and to acquire travel settings for the one or more nearby vehicles;
   an adaptive cruise control module including instructions that when executed by the one or more processors cause the one or more processors to present, using a vehicle output system, the travel settings for the one or more nearby vehicles, the travel settings including set distance information, the set distance information including a numerical range below a first distance value, a numerical range above the first distance value, or a range between the first distance value and a second distance value; and
   an autonomous driving module including instructions that when executed by the one or more processors cause the one or more processors to receive input from the vehicle operator, through an input system of the vehicle, regarding a selected vehicle of the one or more nearby vehicles to follow.

2. The adaptive cruise control system of claim 1, wherein the travel settings further include a set speed.

3. The adaptive cruise control system of claim 1, wherein the travel settings are estimated using a vehicle type, weather conditions, road conditions, operator characteristics, or combinations thereof.

4. The adaptive cruise control system of claim 1, wherein the travel settings further include a set distance.

5. The adaptive cruise control system of claim 1, wherein the autonomous driving module including instructions that when executed by the one or more processors cause the one or more processors to present, using the vehicle output system, the selected vehicle to follow.

6. The adaptive cruise control system of claim 1, wherein the vehicle identification module further includes instructions that when executed by the one or more processors cause the one or more processors to acquire the location information directly from the one or more nearby vehicles.

7. The adaptive cruise control system of claim 1, wherein the travel settings are acquired via a dedicated short-range communication (DSRC) network.

8. The adaptive cruise control system of claim 1, wherein acquiring travel settings for the one or more nearby vehicles includes estimating a future travel of the one or more nearby vehicles.

9. An adaptive cruise control system for presenting travel settings of nearby vehicles for a selection of a vehicle to follow, comprising:
   one or more processors; and
   a memory communicably coupled to the one or more processors and storing:
   a vehicle identification module including instructions that when executed by the one or more processors cause the one or more processors to acquire location information about one or more nearby vehicles within an external environment of a vehicle, and to acquire travel settings for the one or more nearby vehicles;
   an adaptive cruise control module including instructions that when executed by the one or more processors cause the one or more processors to present, using a vehicle output system, the travel settings for the one or more nearby vehicles; and
   an autonomous driving module including instructions that when executed by the one or more processors cause the one or more processors to receive, using an input device of the vehicle, one or more driver travel settings, and to select a selected vehicle of the one or more nearby vehicles to follow, wherein the driver travel settings include set distance information, the set distance information including a numerical range below a first distance value, a numerical range above the first distance value, or a range between the first distance value and a second distance value.

10. A non-transitory computer-readable medium for presenting travel settings of nearby vehicles for a selection of a vehicle to follow and storing instructions that when executed by one or more processors cause the one or more processors to:

acquire location information about one or more nearby vehicles within an external environment of a vehicle;

acquire travel settings for the one or more nearby vehicles;

present, using a vehicle output system, the travel settings for the one or more nearby vehicles, the travel settings including set distance information, the set distance information including a numerical range below a first distance value, a numerical range above the first distance value, or a range between the first distance value and a second distance value; and receive input from the vehicle operator, through an input system of the vehicle, regarding a selected vehicle of the one or more nearby vehicles to follow.

11. The non-transitory computer-readable medium of claim 10, wherein the travel settings including set speed information.

\* \* \* \* \*